US011334334B2

(12) United States Patent
Rosenzwig et al.

(10) Patent No.: US 11,334,334 B2
(45) Date of Patent: May 17, 2022

(54) GENERATING A SOFTWARE RELEASE BASED ON CONTROLLER METADATA

(71) Applicant: Red Hat, Inc., Raleigh, NC (US)

(72) Inventors: Ido Rosenzwig, Kfar Yona (IL); Daniel Belenky, Be'er Ya'akov (IL); Gal Ben Haim, Herzliya (IL); Simone Tiraboschi, Grumello del Monte (IT)

(73) Assignee: Red Hat, Inc., Raleigh, NC (US)

( * ) Notice: Subject to any disclaimer, the term of this patent is extended or adjusted under 35 U.S.C. 154(b) by 6 days.

(21) Appl. No.: 17/004,172

(22) Filed: Aug. 27, 2020

(65) Prior Publication Data

US 2022/0066764 A1   Mar. 3, 2022

(51) Int. Cl.
*G06F 8/61* (2018.01)

(52) U.S. Cl.
CPC ...................... *G06F 8/63* (2013.01)

(58) Field of Classification Search
CPC .......................................................... G06F 8/63
See application file for complete search history.

(56) References Cited

U.S. PATENT DOCUMENTS

| 9,047,160 | B2 * | 6/2015 | Adi | G06F 8/63 |
| 9,910,656 | B2 * | 3/2018 | Arcese | G06F 9/45558 |
| 2007/0169049 | A1 * | 7/2007 | Gingell | G06F 8/61 717/151 |
| 2011/0295939 | A1 * | 12/2011 | Andrade | G06F 9/548 709/203 |
| 2012/0066669 | A1 * | 3/2012 | Bouzakis | G06F 8/658 717/168 |
| 2013/0138783 | A1 * | 5/2013 | Mallur | G06F 8/65 709/221 |
| 2014/0196028 | A1 * | 7/2014 | Macpherson | G06F 8/63 718/1 |
| 2015/0199188 | A1 * | 7/2015 | Mantripragada | G06F 8/60 717/101 |
| 2018/0075152 | A1 * | 3/2018 | Zhang | G06Q 20/16 |

(Continued)

OTHER PUBLICATIONS

He, "Applications Deployment on the SaaS Platform", 2010, IEEE (Year: 2010).*

(Continued)

*Primary Examiner* — Wei Y Zhen
*Assistant Examiner* — Junchun Wu
(74) *Attorney, Agent, or Firm* — Kilpatrick Townsend & Stockton LLP

(57) ABSTRACT

Software releases can be generated based on controller metadata in some examples. In one such example, a system can receive metadata files including a set of properties for controllers executable in a distributed computing environment to manage software components collectively forming a software application. Each metadata file can specify respective properties for a respective controller. The system can extract deployment details from the set of properties included in the metadata files, where the deployment details can specify how the controllers are to be deployed in the distributed computing environment. The system can then generate combined metadata that includes the deployment details from the metadata files. The system can incorporate the combined metadata into a software release, so that the software release can be used to deploy the controllers in accordance with the combined metadata.

17 Claims, 6 Drawing Sheets

(56) References Cited

U.S. PATENT DOCUMENTS

| | | | |
|---|---|---|---|
| 2018/0103064 A1* | 4/2018 | Ahuja | H04L 63/20 |
| 2018/0113680 A1* | 4/2018 | Browning | G06F 8/30 |
| 2018/0115635 A1* | 4/2018 | Ahuja | H04L 63/0428 |
| 2018/0287883 A1* | 10/2018 | Joshi | G06F 9/45558 |
| 2019/0190776 A1* | 6/2019 | Bregman | G06F 9/5072 |
| 2019/0235861 A1* | 8/2019 | Suarez | G06F 8/63 |
| 2019/0349428 A1 | 11/2019 | Kovacheva et al. | |
| 2020/0167199 A1* | 5/2020 | Zur | G06N 20/00 |
| 2020/0241865 A1* | 7/2020 | Phong | H04L 67/02 |
| 2020/0241867 A1* | 7/2020 | Gainsborough | G06F 8/63 |
| 2021/0055947 A1* | 2/2021 | Mahajan | G06F 8/65 |
| 2021/0132974 A1* | 5/2021 | Watt, Jr | G06F 9/45558 |
| 2021/0311715 A1* | 10/2021 | Dirks | G06F 9/45558 |

OTHER PUBLICATIONS

Indrasiri et al., "Deploying and Running Microservices", 2018, Springer (Year: 2018).*

Cottrell, "Deployment and Monitoring", 2020, Springer (Year: 2020).*

Otte et al., "Efficient and deterministic application deployment in component-based enterprise distributed real-time and embedded systems", Aug. 2012, Elsevier (Year: 2012).*

Malina, "Kubernetes Canary Deployment Controller", 2019, BRNO University of Technology (Year: 2019).*

Dearle, "Software Deployment, Past, Present and Future", 2007, IEEE (Year: 2007).*

"Working with Operators in OpenShift Container Platform 4.2," Red Hat, Inc., 2020, https://access.redhat.com/documentation/en-us/openshift_container_platform/4.2/html-single/operators/index.

Javier, L., et al., "Operator Lifecycle Manager Review," Dec. 17, 2019, https://medium.com/@luis.ariz/operator-lifecycle-manager-review-f0885f9f3f1f.

"Building a Cluster Service Version (CSV) for the Operator Framework," GitHub, Inc., 2020, https://github.com/operator-framework/operator-lifecycle-manager/blob/master/doc/design/building-your-csv.md.

"Operator Lifecycle Manager," GitHub, Inc., 2020, https://github.com/operator-framework/operator-lifecycle-manager.

Tenzer, K., "OpenShift Operator Lifecycle Management Guide: Integrating Operators in OLM Part IV," 2020, https://keithtenzer.com/2020/04/23/openshift-operator-lifecycle-management-guide-integrating-operators-in-olm-part-iv/.

Zhuang, W., "Dive into Operators, Part 3:Design and Create Operators based on the Controller Runtime," Dec. 10, 2019, https://developer.ibm.com/technologies/containers/tutorials/kubernetes-operators-framework/.

* cited by examiner

GENERATING A SOFTWARE RELEASE BASED ON CONTROLLER METADATA

TECHNICAL FIELD

The present disclosure relates generally to generating software releases. More specifically, but not by way of limitation, this disclosure relates to generating a software release based on controller metadata.

BACKGROUND

Distributed computing environments have recently grown in popularity. Given the complexity of distributed computing environments, it has become increasingly common for distributed computing environments to include automation software to automate various repeatable tasks. One example of automation software is a container orchestration platform. A container orchestration platform can automate the deployment, scaling, and management of software components (e.g., applications and microservices) inside containers to significantly reduce the workloads of users.

One popular container orchestration platform is Kubernetes. Kubernetes environments (distributed computing environments running Kubernetes) include can operators for automating various repeatable tasks, such as deployment, scaling, and backup of software components. An operator is a software extension to Kubernetes that makes use of one or more custom resources to manage an assigned software component, such as a stateful application. A custom resource is an extension of the Kubernetes application programming interface (API). Operators are generally used to create, configure, manage, and operate instances of an assigned software component on behalf of a user in a declarative way. For example, an operator can monitor the state of its assigned software component and perform one or more operations in response to detecting a state change.

Operators can be deployed in a Kubernetes environment by an Operator Lifecycle Manager (OLM). The OLM is designed to assist users in installing, updating, and managing the lifecycles of all operators in the Kubernetes environment. The OLM can deploy the operators based on manifest files (e.g., YAML files) defining properties of the operators.

Kubernetes environments may also include meta-operators. A meta-operator is a software extension to Kubernetes that typically manages the other operators described above. For example, a meta-operator can create the custom resources used by the other operators in performing their functionalities. But it is also possible for meta-operators to manage other meta-operators. In this way, meta-operators may allow for several levels of management in a Kubernetes environment.

DETAILED DESCRIPTION

Figure 1:
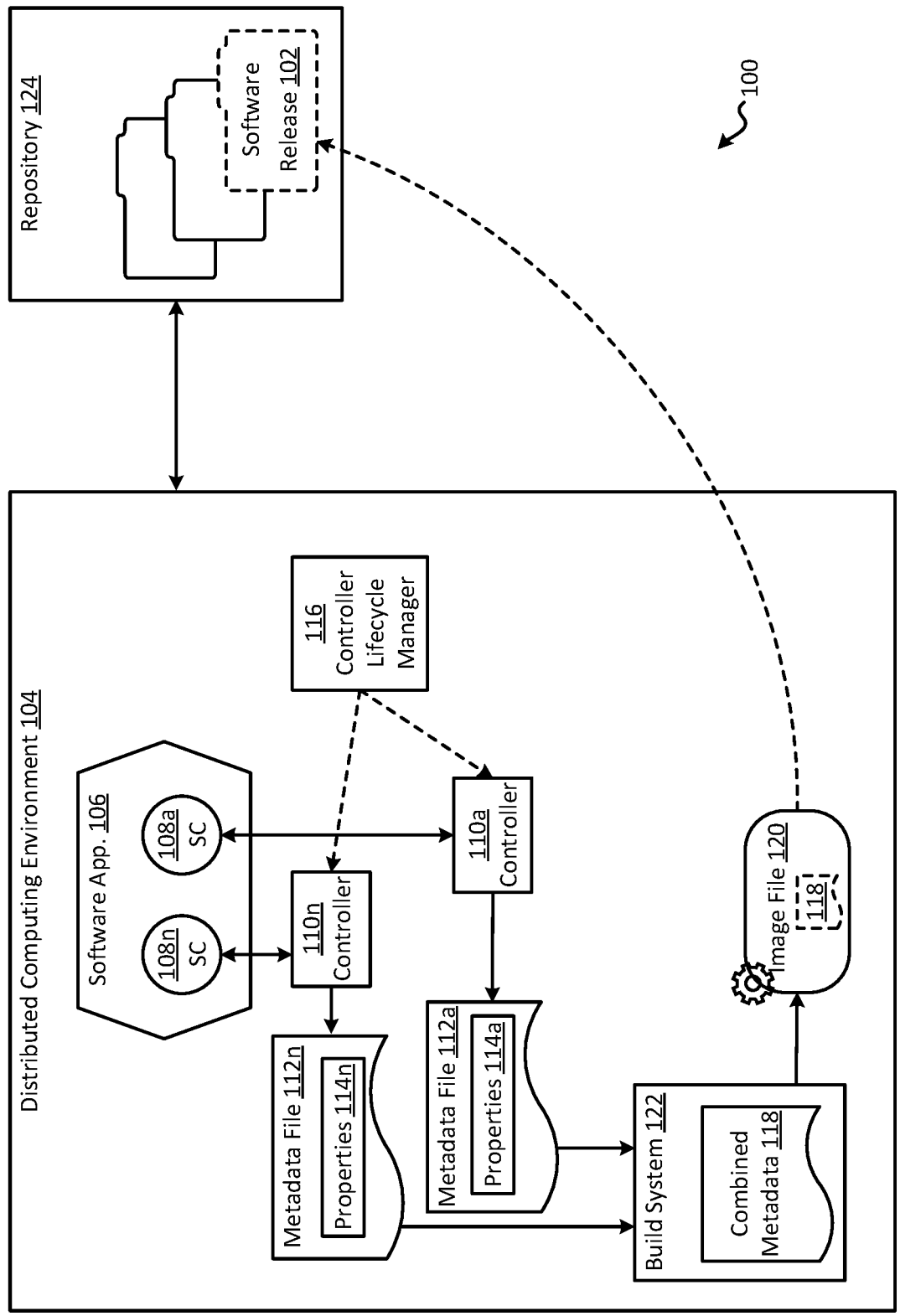
FIG. 1 is a block diagram of an example of a system for generating a software release according to some aspects.

A typical software release for a complex software application generally includes image files for deploying the various software components (e.g., microservices) forming the software application. After the software application is deployed, for example in a Kubernetes environment, operators may also be deployed to assist with managing the software components. The operators are generally deployed by an Operator Lifecycle Manager (OLM) such that they are treated independently of one another, by using manifest files downloaded from resources (e.g., websites) that are separate from the software release. This can cause a variety of problems. For example, the independent treatment of the operators can make updating and managing the operators time consuming and difficult. The independent treatment of the operators may also result in conflicts and incompatibilities among the operators, for example if an operator is updated in a way that renders it incompatible with the other operators.

Some examples of the present disclosure can overcome one or more of the abovementioned problems by packaging metadata used in deploying multiple controllers (e.g., Kubernetes operators) into a single file for inclusion in a software release. A controller is a piece of software configured to monitor a particular software component and assist with automating one or more tasks related to that software component. As one particular example, the metadata from multiple manifest files associated with multiple operators can be combined together into a single file, which in turn can be incorporated into a software release. By incorporating the metadata for multiple controllers into a single file, a controller lifecycle manager (e.g., an OLM) can ingest the metadata as a single unit and consequently treat the controllers together as a single unit, rather than independently from one another. This can expedite and simplify management and updating of the controllers, and prevent inconsistencies and incompatibilities between controllers. And by including the single file in the software release, the metadata can form part of the software release and thereby simplify installation of the related software application and its corresponding controllers. Further, a file for deploying a meta-controller (e.g., a meta-operator) can be included in the software release to assist in managing the other operators. In this way, all of the elements used to run a complex software application, such as its software components, operators, and meta-operators, are grouped together into a software release for the software application that is easily deployable.

One specific example can relate to generating a software release for a container-native virtualization platform, such as Red Hat's OpenShift virtualization. The container-native virtualization platform can be formed from multiple microservices. Microservices are self-contained stateless services that are generally designed to perform a specific task. Microservices can communicate with each other through well-defined application programming interfaces (APIs) in order to work together to generate responses to end-user requests. Individual microservices may be "owned" or developed by different developers, with each microservice being developed, updated, and deployed independently of other microservices. Software applications formed from microservices can provide improvements to scalability, robustness, isolation, and development time over conventional monolithic software-applications.

To begin the process of building the software release, the microservices forming the container-native virtualization platform can be deployed in a cloud computing environment running Kubernetes. Examples of the microservices can include a storage microservice, a network microservice, and a virtualization microservice. Operators can also be deployed in the cloud computing environment for managing the various microservices. For example, a first operator can be deployed to manage the storage microservice, a second operator can be deployed to manage the network microservice, and a third operator can be deployed to manage the virtualization microservice.

With the operators deployed, a command can be issued to the Kubernetes API for automatically generating text files called ClusterServiceVersion (CSV) files for the operators. CSV files are manifest files describing properties of the corresponding operators. CSV files can specify information like a logo, description, and version for the corresponding operator. Such information may be used to populate various user interfaces of the cloud computing environment, such as a user interface for an OLM in a Kubernetes environment. CSV files can also include deployment details required to run the corresponding operators, such as role-based access control (RBAC) rules and information about which custom resources the operator manages or depends on. The CSV files can be automatically generated by the cloud computing environment in response to a "gen-csv" command.

Next, parts of the CSV files can be merged together to form combined metadata. For example, the deployment details can be extracted from each CSV file and combined together to form the combined metadata. The deployment details from a CSV file can specify files and other information used in deploying a corresponding operator. The combined metadata can provide an overall deployment strategy for deploying the operators in a computing environment.

The combined metadata can then be included in a software release for the container-native virtualization platform. For example, the software release can be generated to include the combined metadata. The combined metadata can allow the operators to be deployed together as a common unit by the OLM in the future. The software release may also include other data, such as a first set of image files for deploying the microservices, a second set of image files for deploying the operators that will manage the microservices, and an image file for deploying a meta-operator for managing the other operators. These image files can allow the microservices, operators, and meta-operator to be easily and rapidly deployed from a single software release, thereby cutting down time-to-deployment and reducing the number of manual tasks typically required to deploy such complex applications.

In the above example, the software release for the container-native virtualization platform can be made publicly available. For example, the container images defining the software release can be uploaded to a public repository from which the they can be downloaded (e.g., individually downloaded) by any number of users.

These illustrative examples are given to introduce the reader to the general subject matter discussed here and are not intended to limit the scope of the disclosed concepts. Other examples may be implemented in other contexts outside of Kubernetes. The following sections describe various additional features and examples with reference to the drawings in which like numerals indicate like elements but, like the illustrative examples, should not be used to limit the present disclosure.

FIG. 1 is a block diagram of an example of a system 100 for generating a software release 102 based on controller metadata according to some aspects. The system 100 includes a distributed computing environment 104, such as a cloud computing environment, a data grid, or a computing cluster. The distributed computing environment 104 may be owned or operated by a company developing the software release 102. The distributed computing environment 104 is formed from multiple nodes (e.g., virtual machines or servers) that can interact with one another to implement some aspects described herein.

The distributed computing environment 104 can execute a software application 106. In the example shown in FIG. 1, the software application 106 is a distributed application (e.g., rather than a monolithic application) formed from any multiple software components 108a-n that are separate from one another and configured to interact with one another. One example of such software components 108a-n can include microservices. The software components 108a-n can execute on one or more nodes of the distributed computing environment 104.

To assist with managing the software components 108a-n, the distributed computing environment 104 can execute automation software. One example of such automation software can be a container orchestration platform, such as Kubernetes. The automation software may include controllers 110a-n. In the example shown in FIG. 1, the controllers 110a-n can monitor the software components 108a-n and assist with automating one or more tasks related to the software components 108a-n. Each controller can be assigned to monitor one of the software components 108a-n and respond to state changes in the software component by executing one or more operations. For example, the controller 110a can monitor a runtime state of software component 108a and determine if the runtime state has drifted from a predesignated target state. If so, the controller 110a can interact with an interface (e.g., an API) of the distributed computing environment 104 to adjust one or more characteristics of the software component 108a, so that the software component 108a more closely conforms to the pre-designated target state. This process of comparing states and making adjustments to reduce state differences can be referred to as reconciliation. The controller 110 can automatically repeat the reconciliation process at predefined intervals (e.g., daily, hourly, or substantially continuously), or the reconciliation process can be automatically triggered in response to state changes of the software component 108a.

The controllers 110a-n can be manually deployed and configured, at least initially. Once the controllers 110a-n are running, one or more commands can be issued to the distributed computing environment 104 for causing the distributed computing environment 104 to generate metadata files 112a-n describing properties 114a-n of the controllers 110a-n. The metadata files 112a-n can have any suitable format. For example, the metadata files 112a-n can be text files with formats such as a YAML Ain't Markup Language (YAML) format or a JavaScript Object Notation (JSON) format. Each metadata file can include respective properties of a corresponding controller. For example, metadata file 112a can include properties 114a of controller 110a, and metadata file 112n can include properties 114n of controller 110n. Examples of the properties can include a name, description, and version of the corresponding controller. The properties can additionally or alternatively include deployment details used to (e.g., required to) run the corresponding controller. Examples of the deployment details can include role-based access control (RBAC) rules and information about resources the controller manages or depends on.

One specific example can arise in the context of Kubernetes. In a Kubernetes environment, the controllers 110*a-n* can be operators and the metadata files 112*a-n* can be CSV files. The CSV files can describe the properties of the corresponding operators. The CSV files can be automatically generated by the distributed computing environment 104 in response to an "gen-csv" command, which can simplify CSV generation for users.

The metadata files 112*a-n* are generally usable by a Controller Lifecycle Manager (CLM) 116 for deploying and managing the controllers 110*a-n* in the future. An example of the CLM 116 can be an Operator Lifecycle Manager in the Kubernetes context, which forms part of an Operator Framework that is designed to manage Kubernetes operators. The CLM 116 can assist users with installing, updating, and managing the lifecycle of some or all of the controllers running in a distributed computing environment. For example, the CLM 116 may manage the lifecycle of all controllers, across all software applications, in a single distributed computing environment 104. The CLM 116 can deploy the controllers 110*a-n* based on the metadata files 112*a-n*. For example, the CLM 116 can ingest a metadata file 112*a* and deploy the corresponding controller 110*a* in accordance with the properties 114*a* specified in the metadata file 112*a*. This can simplify and automate at least some aspects of controller deployment.

After generating the metadata files 112*a-n*, the distributed computing environment 104 can merge some or all of the properties 114*a-n* in the metadata files 112*a-n* into combined metadata 118. In some examples, a build system 122 such as Koji or Docker can perform this merger. Merging the properties 114*a-n* can involve concatenating or otherwise combining them together to form the combined metadata 118. For example, the deployment details of the metadata files 112*a-n* can be merged together in the combined metadata 118 to form an overall deployment strategy for deploying the controllers 110*a-n*. An overall deployment strategy is a deployment strategy for deploying multiple controllers in a distributed computing environment. The overall deployment strategy can include names and locations (e.g., uniform resource locations) of one or more files (e.g., image files) configured to deploy each individual controller, combined together. The order of the deployment details in the combined metadata 118 may dictate the order in which controllers 110*a-n* are to be deployed. The combined metadata 118 may have a similar format to the metadata files 112*a-n* and may be configured to be ingested by the CLM 116 as a single unit. By combining the deployment details for multiple controllers 110*a-n* together into the combined metadata 118, the controllers 110*a-n* may be treated as a single unit by the CLM 116. This may yield significant efficiencies in terms updating and managing the controllers 110*a-n*, in contrast to typical configurations in which each metadata file 112*a-n* is ingested separately by the CLM 116 and each corresponding controller is treated independently of the other controllers. After generating the combined metadata 118, the distributed computing environment 104 can then store the combined metadata 118 in a file. An example of the file can be an image file 120, which may be built by the build system 122.

Next, the file can be included in a software release 102. Other files for deploying the software components 108*a-n* can also be included in the software release 102. In this way, the software release 102 can include all of the relevant files (e.g., container images) to automatically and quickly deploy the software application 106 and the corresponding controllers 110*a-n* in one or more distributed computing environments. The software release 102 can serve as a new software release for the software application 106.

In some examples, the distributed computing environment 104 can transmit (e.g., upload) the files defining the software release 102 to a repository 124. The distributed computing environment 10 can transmit these files to the repository 124 via one or more networks, such as a local area network (LAN) or the Internet. In some examples, the repository 124 can be an image repository in which any number and combination of images defining any number and combination of software releases may be stored. Any number of users may be able to download the software release 102 from the repository 124.

While the example shown in FIG. 1 includes a certain number and arrangement of components, these are not intended to be limiting. It will be appreciated that other examples may include more components, fewer components, or different components than are shown in FIG. 1. For instance, other examples can exclude the build system 122 or the repository 124.

Figure 2:
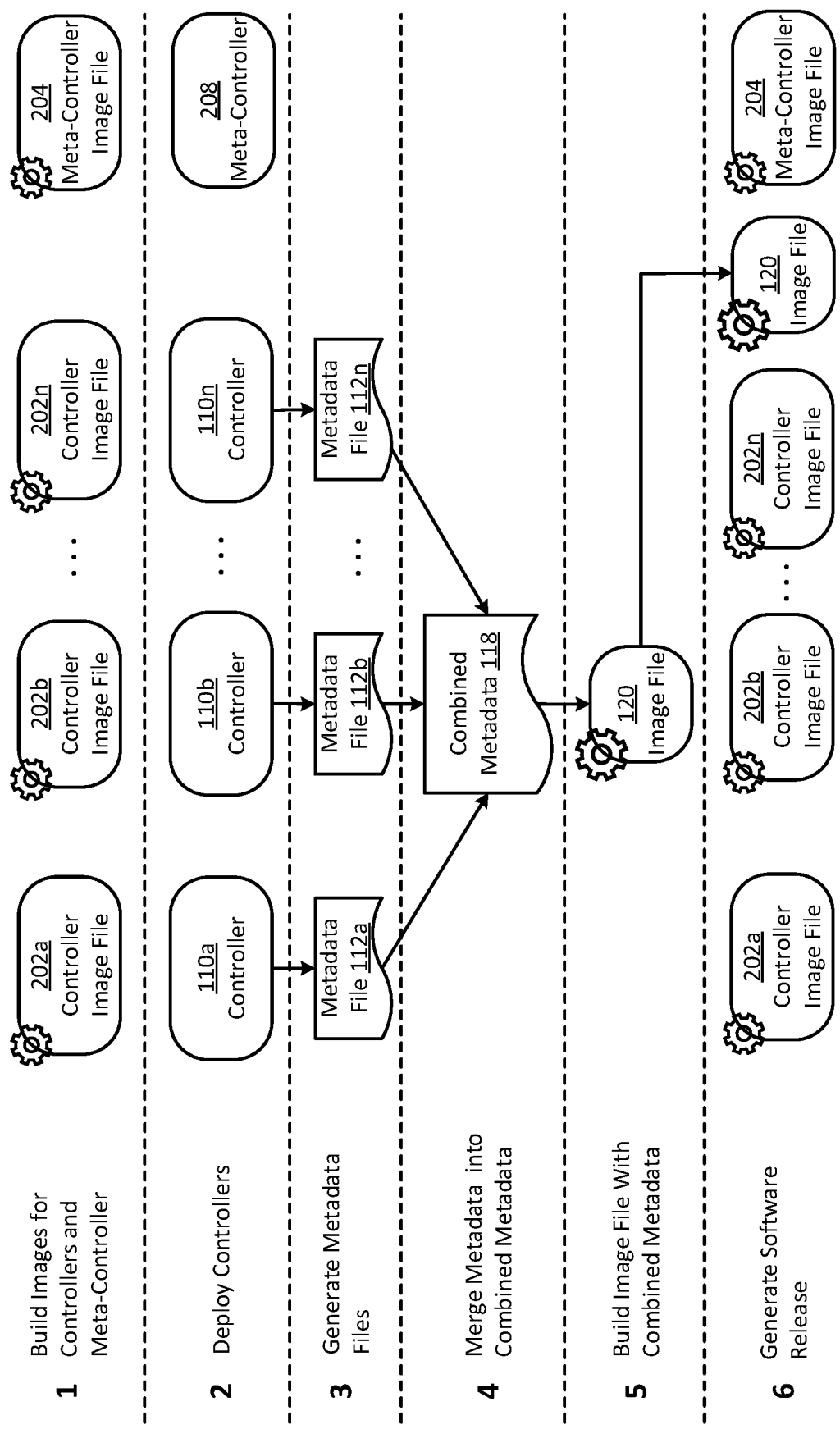
FIG. 2 is a diagram of an example of a process for generating a software release according to some aspects.

FIG. 2 is a diagram of an example of a process for generating a software release based on controller metadata according to some aspects. The process can be implemented, for example, by the distributed computing environment 104 of FIG. 1. The steps of FIG. 2 are discussed below with reference to the components discussed above in relation to FIG. 1.

The process can begin at step 1, which involves generating image files for deploying controllers 110*a-n*. These image files are referred to herein as controller image files 202*a-n*. A build system such as Koji or Docker can be used to generate the controller image files 202*a-n*. For example, the command "operator-sdk build <filename>" can be issued to build a Docker image file for a controller. Each of the controller image files 202*a-n* can store data (e.g., libraries, files, program code, etc.) for deploying one of the corresponding controllers 110*a-n*.

In some examples, step 1 can also involve generating an image file for deploying a meta-controller 208. This image file is referred to herein as a meta-controller image file 204. The meta-controller 208 can be a controller configured to manage the other controllers 110*a-n* deployed using the controller image files 202*a-n*.

In step 2, the controller image files 202*a-n* are used to deploy corresponding controllers 110*a-n*. Meta-controller image file 204 can also be used to deploy a meta-controller 208 that manages the controllers 110*a-n*.

In some examples, the meta-controller 208 can serve as a single point of contact for interfacing with controllers 110*a-n*. For example, a user can access a CLM and issue commands associated with the controllers 110*a-n* via the CLM. The CLM, in turn, can convey the commands to the meta-controller 208. The meta-controller 208 can receive the commands, determine one or more operations to perform with respect to one or more of the controllers 110*a-n* based on the commands, and execute the one or more operations. In this way, the meta-controller 208 can serve as a single point of contact with which the CLM (and the user) can easily interact with the controllers 110*a-n*. As another example, the meta-controller 208 can obtain status information or other information relating to one or more of the controllers 110*a-n* and transmit that information to the CLM, which in turn can provide that information to the user. In this way, the meta-controller 208 can serve as a single point of contact with which the CLM (and the user) can obtain information about the controllers 110*a*-*n*.

In some example, the meta-controller 208 can also automatically perform any number and combination of management functions with respect to the controllers 110*a*-*n*. For example, the meta-controller 208 can perform reconciliation with respect to the controllers 110*a*-*n*. This can involve comparing a state (e.g., a configuration state or runtime state) of a controller to a predesignated target state and adjusting one or more characteristics of the controller based on a difference between the two states, so that the controller more closely conforms to the predesignated target state.

In step 3, metadata files 112*a*-*n* are generated for the corresponding controllers 110*a*-*n*. For example, the "gencsv" command can be issued to the distributed computing environment that includes the controllers 110*a*-*n*, which can cause the distributed computing environment to generate the metadata files 112*a*-*n*. The metadata files 112*a*-*n* can be CSV files in some examples.

In step 4, some or all of the properties from each of the metadata files 112*a*-*n* are extracted and merged together to form combined metadata 118. For example, the deployment details from each of the metadata files 112*a*-*n* can be extracted from the metadata files 112*a*-*n* and merged together to from the combined metadata 118.

In step 5, an image file 120 is built that includes the combined metadata 212. For example, the build system 122 of FIG. 1 can build the image file 120 to include the combined metadata 212.

In step 6, a software release 102 is generated. The software release 102 can include the controller image files 202*a*-*n*, the image file 120 with the combined metadata 212, and the meta-controller image file 204. The software release 102 may then be uploaded to a repository 124 or otherwise made available to the public. For example, each of the image files defining the software release 102 can be individually uploaded to the repository 124 to form the software release 102.

While the above example involves image files for illustrative purposes, other example may involve other types of binary files, and the present disclosure is not intended to be limited to image files. It will also be appreciated that some examples may exclude some aspects described above.

Figure 3:
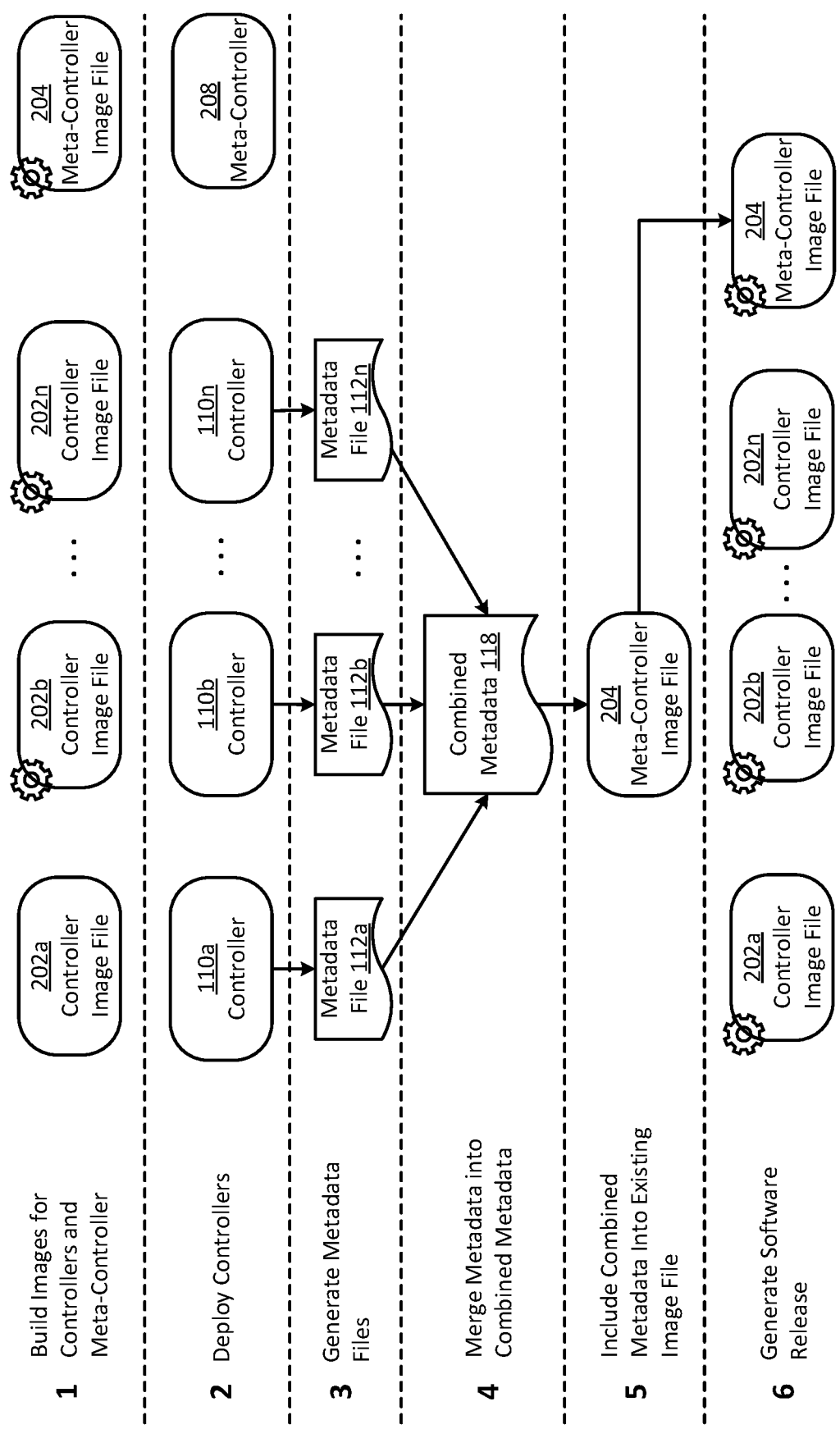
FIG. 3 is a diagram of an example of another process for generating a software release according to some aspects.

FIG. 3 is a diagram of another example of a process for generating a software release based on controller metadata according to some aspects. The process can be similar to the process shown in FIG. 2, except that the combined metadata 212 can be incorporated into one or more of the existing files (e.g., rather than building a separate file with the combined metadata 212), such as the meta-controller image file 204 or the controller image files 202*a*-*n*. This can reduce the total number of files forming the software release 102 and can reduce the total size of the software release 102. This may also retain an existing format (e.g., file structure) of the software release 102, which may aid in maintaining backwards compatibility with existing deployment tools. While FIG. 3 depicts image files for illustrative purposes, it will be appreciated that other examples may involve other types of binary files.

Figure 4:
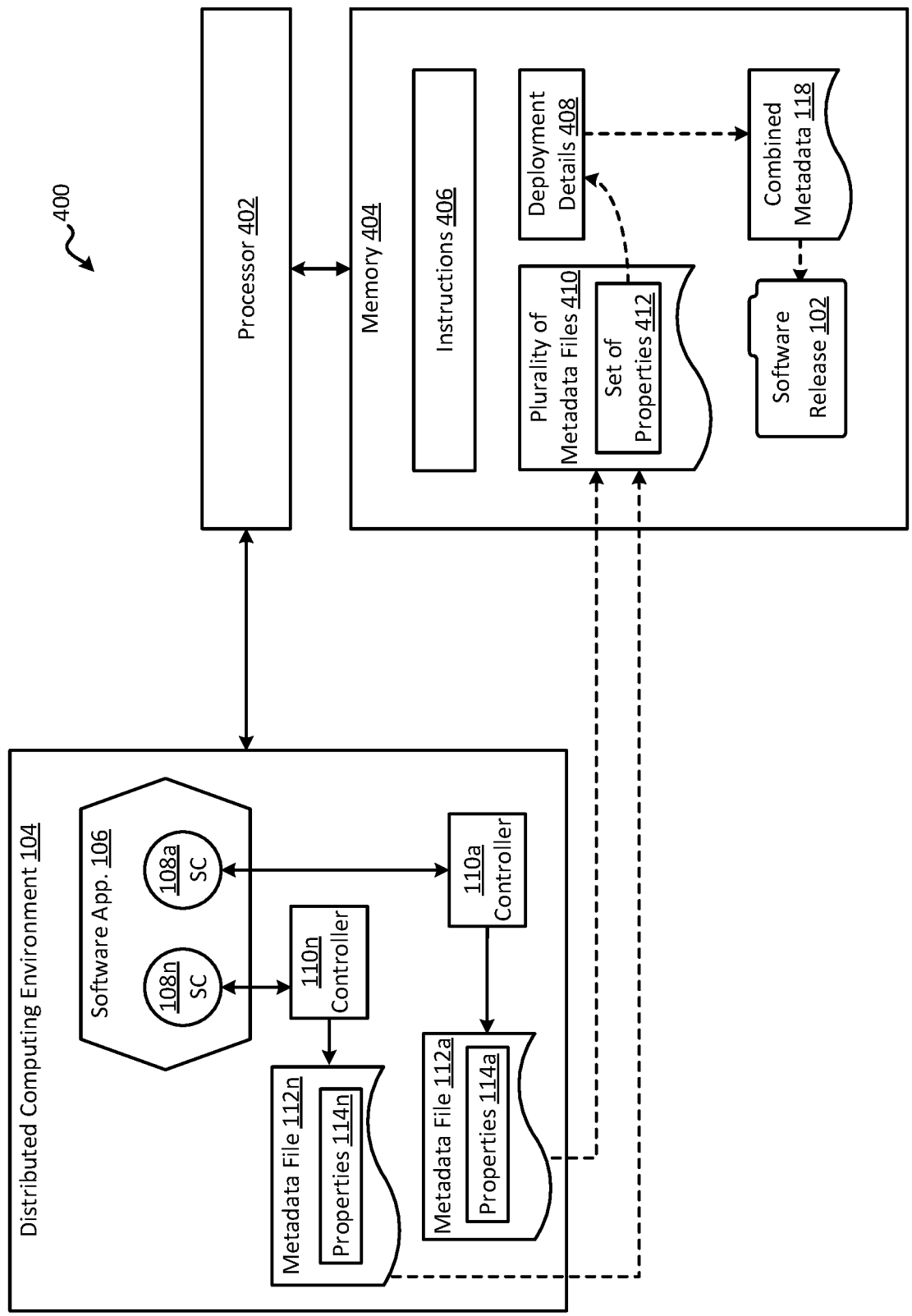
FIG. 4 is a block diagram of another example of a system for generating a software release according to some aspects.

FIG. 4 is a block diagram of another example of a system 400 for generating a software release 102 based on controller metadata according to some aspects. The system 400 includes a processor 402 communicatively coupled with a memory 404. In some examples, the processor 402 and the memory 404 can be parts of a distributed computing environment, such as the distributed computing environment 104 of FIG. 1.

The processor 402 can include one processor or multiple processors. Non-limiting examples of the processor 402 include a Field-Programmable Gate Array (FPGA), an application-specific integrated circuit (ASIC), a microprocessor, etc. The processor 402 can execute instructions 406 stored in the memory 404 to perform operations. In some examples, the instructions 406 can include processor-specific instructions generated by a compiler or an interpreter from code written in any suitable computer-programming language, such as C, C++, C#, etc.

The memory 404 can include one memory or multiple memories. The memory 404 can be non-volatile and may include any type of memory that retains stored information when powered off. Non-limiting examples of the memory 404 include electrically erasable and programmable read-only memory (EEPROM), flash memory, or any other type of non-volatile memory. At least some of the memory can include a non-transitory computer-readable medium from which the processor 402 can read instructions 406. The non-transitory computer-readable medium can include electronic, optical, magnetic, or other storage devices capable of providing the processor 402 with computer-readable instructions or other program code. Examples of the non-transitory computer-readable medium include magnetic disk(s), memory chip(s), ROM, random-access memory (RAM), an ASIC, a configured processor, optical storage, or any other medium from which a computer processor can read the instructions 406.

In some examples, the processor 402 can receive a plurality of metadata files 410 including a set of properties 412 for a plurality of controllers 110*a*-*n*. The plurality of controllers 110*a*-*n* can be executed in a distributed computing environment 104 to manage a plurality of software components 108*a*-*n* collectively forming a software application 106. Each metadata file 112*a*-*n* of the plurality of metadata files 410 can specify respective properties 114*a*-*n* for a respective controller among the plurality of controllers 110*a*-*n*. The processor 402 can next extract deployment details 408 from the set of properties 412 included in the plurality of metadata files 410. The deployment details 408 can specify how the plurality of controllers 110*a*-*n* are to be deployed in a distributed computing environment, such as distributed computing environment 104.

After extracting the deployment details 408, the processor 402 can generate combined metadata 118 that includes the deployment details 408 from the plurality of metadata files 410. The processor 402 can then incorporate the combined metadata 118 into a software release 102 for the software application 106. As a result, the software release 102 can be used to deploy the plurality of controllers 110*a*-*n* in accordance with the combined metadata 118 in one or more distributed computing environments. The software release 102 can also include other files for deploying the plurality of software components 108*a*-*n* in the one or more distributed computing environments. The software release 102 may further include a file for deploying a meta-controller the one or more distributed computing environments, where the meta-controller can manage the plurality of controllers 110*a*-*n*.

Figure 5:
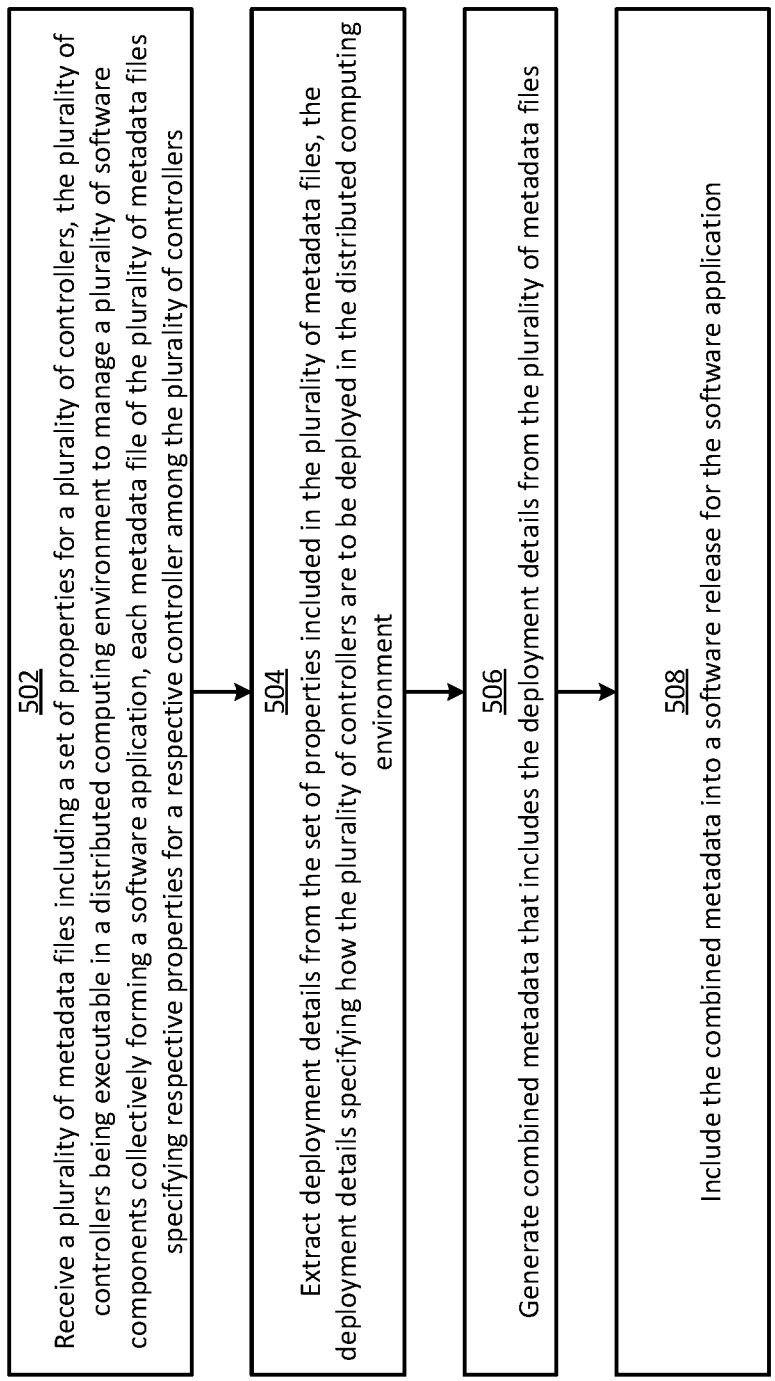
FIG. 5 a flow chart of an example of a process for generating a software release according to some aspects of the present disclosure.

In some examples, the processor 402 can implement some or all of the steps shown in FIG. 5. Other examples can include more steps, fewer steps, different steps, or a different order of the steps than is shown in FIG. 5. The steps of FIG.

5 are discussed below with reference to the components discussed above in relation to FIG. 4.

In block 502, the processor 402 receives a plurality of metadata files 410 including a set of properties 412 for a plurality of controllers 110a-n. The plurality of controllers 110a-n can be executed in a distributed computing environment 104 to manage a plurality of software components 108a-n collectively forming a software application 106. Each metadata file 112a-n of the plurality of metadata files 410 can specify respective properties 114a-n for a respective controller among the plurality of controllers 110a-n.

In block 504, the processor 402 extracts deployment details 408 from the set of properties 412 included in the plurality of metadata files 410. For example, the processor 402 can open each of the metadata files 410 and extract respective deployment details therefrom. The deployment details 408 can specify how the plurality of controllers 110a-n are to be deployed in a distributed computing environment.

In block 506, the processor 402 generates combined metadata 118 that includes the deployment details 408 from the plurality of metadata files 410. The processor 402 can generate the combined metadata 118 by concatenating together the deployment details 408, in some examples. The processor 402 can then store the combined metadata 118 in a file, such as an image file or another type of file (e.g., a text file or a binary file).

In block 508, the processor 402 includes the combined metadata 118 into a software release 102 for the software application 106. The software release 102 can include multiple individual files, such as image files, that collectively define the software release 102. The software release 102 can be configured for deploying the plurality of controllers 110a-n in accordance with the combined metadata 118 in one or more distributed computing environments. The software release 102 can also be configured for deploying the plurality of software components 108a-n and a meta-controller, as described above.

Figure 6:
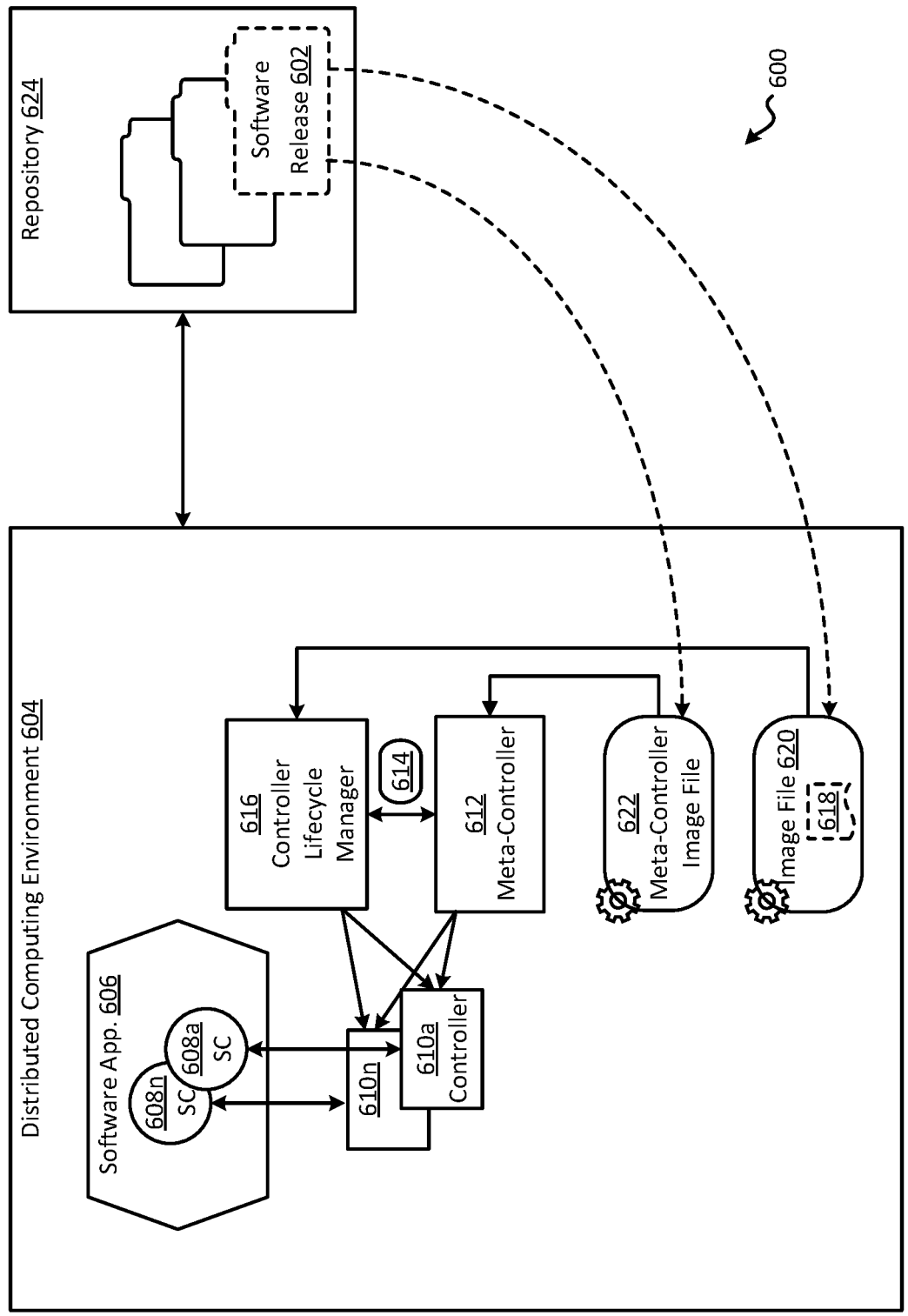
FIG. 6 is a block diagram of an example of a system for using a software release generated according to some aspects.

FIG. 6 is a block diagram of an example of a system 600 for deploying a software release 602 generated using any of the processes described above. The system 600 can include a distributed computing environment 604, such as a cloud computing environment, a data grid, or a computing cluster. The distributed computing environment 604 may be owned or operated by a customer that has purchased the software release 602 from a developer. The distributed computing environment 604 can be formed from at least one processor and at least one memory, which may be similar to the processor 402 and the memory 404 of FIG. 4.

To deploy the software release 602, the distributed computing environment 604 can receive a set of image files (not shown for simplicity) from a repository 624. The set of image files can correspond to the software components 608a-n that define the software application 606. The repository 624 may be the same as or different from the repository 124 of FIG. 1. The distributed computing environment 604 can then deploy the software application 606 from the set of image files. For example, the distributed computing environment 604 can include a deployment engine, such as Docker, for deploying the software components 608a-n. The deployment engine can ingest the image files and deploy the software components 608a-n therefrom.

The distributed computing environment 604 can also receive controller image files (not shown for simplicity) and combined metadata 618 from the repository 624, where the controller image files and the combined metadata 618 form part of the software release 602. For example, the distributed computing environment 604 can download the controller image files from the repository 624. The distributed computing environment 604 can also download an image file 620 that includes the combined metadata 618 from the repository 624. The distributed computing environment 604 can then use a CLM 616, which can be similar to the CLM 116 of FIG. 1, to deploy controllers 610a-n based on the controller image files and the combined metadata 618. Deploying the controllers 610a-n can involve running the controllers 610a-n based on the controller image files and configuring the controllers 610a-n based on the combined metadata 618. Once deployed, the controllers 610a-n can manage the software components 608a-n. In this way, the distributed computing environment 604 can automatically and rapidly deploy a complex software application 606 containing multiple software components 608a-n, as well as controllers 610a-n for the software components 608a-n, from a single software release 602.

In some examples, the distributed computing environment 604 may further download a meta-controller image file 622 from the repository 624, where the meta-controller image file 622 forms part of the software release 602. The distributed computing environment 604 can then use the CLM 616 to deploy the meta-controller 612 based on the meta-controller image file 622. Once deployed, the meta-controller 612 can manage the other controllers 610a-n and can serve as a single point of contact through which a user or the distributed computing environment 604 can interface with the controllers 510a-n. In this way, the distributed computing environment 604 can also automatically and rapidly deploy the meta-controller 612 from the single software release 602.

In some examples, the CLM 616 can pass information 614 from the combined metadata 618 to the meta-controller 612, which can use the information 614 in managing the controllers 610a-n. For example, the CLM 616 can receive one or more parameter values (e.g., values for environment variables) from the combined metadata 618. The CLM 616 can then transmit the one or more parameter values to the meta-controller 612. The meta-controller 612 can receive the one or more parameter values from the CLM 616 and manage (e.g., configure) one or more of the controllers 610a-n based on the one or more parameter values.

It will be appreciated that the software release 602 can be the same as or different from the software release 102 described above in relation to FIGS. 1-5. If the software release 602 is the same as the software release 102, then the image file 620 can be the same as the image file 120 described above, the combined metadata 618 can be the same as the combined metadata 118, the controllers 610a-n can be the same as the controllers 110a-n, the software components 608a-n can be the same as the software components 108a-n, the software application 606 can be the same as the software application 106, the meta-controller image file 622 can be the same as the meta-controller image file 204, the meta-controller 612 can be the same as the meta-controller 208, or any combination of these. If the software release 602 is different from the software release 102, then the image file 620 can be different from the image file 120, the combined metadata 618 can be different from the combined metadata 118, the controllers 610a-n can be different from the controllers 110a-n, the software components 608a-n can be different from the software components 108a-n, the software application 606 can be different from the software application 106, the meta-controller image file 622 can be different from the meta-controller image file 204, the meta-controller 612 can be different from the meta-controller 208, or any combination of these.

While the example shown in FIG. 6 includes a certain number and arrangement of components, these are not intended to be limiting. It will be appreciated that other examples may include more components, fewer components, or different components than are shown in FIG. 6. For instance, other examples can exclude the meta-controller image file 622, the meta-controller 612, the repository 624, or any combination of these. And while FIG. 6 involves image files for illustrative purposes, other example may involve other types of binary files for implementing some aspects of the present disclosure. Further, the distributed computing environment 604 may be the same as the distributed computing environment 104, in some examples.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processor; and
a memory including instructions that are executable by the processor for causing the processor to perform operations comprising:
receiving combined metadata forming part of a software release for a software application, the combined metadata including deployment details for deploying a plurality of controllers that are configured to manage a plurality of software components collectively forming the software application, the software release including a first set of image files for deploying the plurality of software components, the software release including a second set of image files for deploying the plurality of controllers, and the software release including an image file including the combined metadata;
extracting the deployment details from the combined metadata; and
deploying the plurality of controllers in a distributed computing environment in accordance with the deployment details.

2. The system of claim 1, wherein each controller of the plurality of controllers is configured to manage a respective software component of the plurality of software components, and wherein the plurality of software components are microservices configured to implement different aspects of the software application.

3. The system of claim 1, wherein the distributed computing environment includes a container orchestration platform, the plurality of controllers are operators of the container orchestration platform, and an Operator Lifecycle Manager (OLM) of the container orchestration platform is configured to deploy the plurality of controllers in accordance with the deployment details in the combined metadata.

4. The system of claim 1, wherein the software release further includes a binary file for deploying a meta-controller in the distributed computing environment, the meta-controller being configured to manage the plurality of controllers in the distributed computing environment.

5. The system of claim 4, wherein the image file that includes the combined metadata is a first image file, and wherein the binary file is a second image file that is separate from the first image file.

6. The system of claim 4, wherein the memory further includes instructions that are executable by the processor for causing the processor to:
deploy the meta-controller in the distributed computing environment using the binary file forming part of the software release.

7. A method comprising:
receiving, by a processor, combined metadata forming part of a software release for a software application, the combined metadata including deployment details for deploying a plurality of controllers that are configured to manage a plurality of software components collectively forming the software application, the software release including a first set of image files for deploying the plurality of software components, the software release including a second set of image files for deploying the plurality of controllers, and the software release including an image file including the combined metadata;
extracting, by the processor, the deployment details from the combined metadata; and deploying, by the processor, the plurality of controllers in a distributed computing environment in accordance with the deployment details.

8. The method of claim 7, wherein each controller of the plurality of controllers is configured to manage a respective software component of the plurality of software components, and wherein the plurality of software components are microservices configured to implement different aspects of the software application.

9. The method of claim 7, wherein the distributed computing environment includes a container orchestration platform, the plurality of controllers are operators of the container orchestration platform, and an Operator Lifecycle Manager (OLM) of the container orchestration platform deploys the plurality of controllers in accordance with the deployment details in the combined metadata.

10. The method of claim 7, wherein the software release further includes a binary file for deploying a meta-controller in the distributed computing environment, the meta-controller being configured to manage the plurality of controllers in the distributed computing environment.

11. The method of claim 10, wherein the image file that includes the combined metadata is a first image file, and wherein the binary file is a second image file that is separate from the first image file.

12. The method of claim 10, further comprising deploying the meta-controller in the distributed computing environment using the binary file.

13. A non-transitory computer-readable medium comprising program code that is executable by a processor for causing the processor to:
receive combined metadata forming part of a software release for a software application, the combined metadata including deployment details for deploying a plurality of controllers that are configured to manage a plurality of software components collectively forming the software application, the software release including a first set of image files for deploying the plurality of software components, the software release including a second set of image files for deploying the plurality of controllers, and the software release including an image file including the combined metadata; and provide the combined metadata to a controller lifecycle manager, the controller lifecycle manager being configured to receive the combined metadata and responsively deploy the plurality of controllers in a distributed computing environment in accordance with the deployment details specified in the combined metadata.

14. The non-transitory computer-readable medium of claim 13, wherein each controller of the plurality of controllers is configured to manage a respective software component of the plurality of software components, and wherein the plurality of software components are microservices configured to implement different aspects of the software application.

15. The non-transitory computer-readable medium of claim 13, wherein the distributed computing environment includes a container orchestration platform, the plurality of controllers are operators of the container orchestration platform, and the controller lifecycle manager is an Operator Lifecycle Manager (OLM).

16. The non-transitory computer-readable medium of claim 13, wherein the software release further includes a binary file for deploying a meta-controller in the distributed computing environment, the meta-controller being configured to manage the plurality of controllers in the distributed computing environment.

17. The non-transitory computer-readable medium of claim 16, further comprising program code that is executable by the processor for causing the processor to:
  deploy the meta-controller from the binary file, the meta-controller being configured to receive one or more parameter values specified in the combined metadata from the controller lifecycle manager and manage the plurality of controllers based on the one or more parameter values.

* * * * *